Patented Sept. 8, 1953

2,651,661

UNITED STATES PATENT OFFICE 2,651,661

PROCESS FOR THE PREPARATION OF 1-p-NITROPHENYL-2-DICHLOROACETAMIDO-PROPANE-1,3-DIOL

Harry R. Gamrath, St. Louis, and William S. Knowles, Kirkwood, Mo., assignors to Monsanto Chemical Company, St. Louis, Mo., a corporation of Delaware No Drawing. Application December 30, 1950, Serial No. 203,798

7 Claims. (Cl. 260—562)

This invention relates to 1-p-nitrophenyl-2-dichloroacetamidopropane-1,3-diol; more specifically, this invention relates to an improved process for the preparation of 1-p-nitrophenyl-2-dichloroacetamidopropane-1,3-diol in all of its various optical and structural isomeric forms.

The various optical and structural isomeric forms of 1-p-nitrophenyl-2-dichloroacetamidopropane-1,3-diol have become of considerable interest as antibiotics. The [l]-ψ-1-p-nitrophenyl-2-dichloroacetamidopropane-1,3-diol is particularly noteworthy in this respect. Heretofore, these compounds have been prepared by reacting 1-p-nitrophenyl-2-aminopropane-1,3-diol with methyl dichloroacetate in the absence of any added solvent as a reaction medium. The procedure described in the prior art indicates that such a process results in a 65–70% yield of the desired 1-p-nitrophenyl-2-dichloroacetamidopropane-1,3-diol based upon 1-p-nitrophenyl-2-aminopropane-1,3-diol. This process may be illustrated by the following equation:

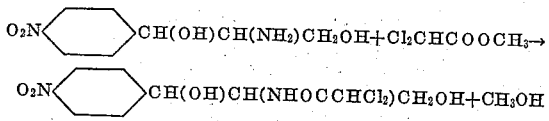

It is an object of this invention to provide an improved process for the production of 1-p-nitrophenyl-2-dichloroacetamidopropane-1,3-diol in significantly higher yields than heretofore obtainable by the reaction of 1-p-nitrophenyl-2-aminopropane-1,3-diol with methyl dichloroacetate. Further objects will become apparent from a description of the novel process of this invention.

It has now been discovered that unusually high yields of 1-p-nitrophenyl-2-dichloroacetamidopropane-1,3-diol may be obtained by reacting 1-p-nitrophenyl-2-aminopropane-1,3-diol and methyl dichloroacetate in a solvent comprising essentially methyl alcohol. In view of the fact that methyl alcohol is also a product of the reaction between 1-p-nitrophenyl-2-aminopropane-1,3-diol and methyl dichloroacetate as indicated in the above equation, the increased yield of 1-p-nitrophenyl-2-dichloroacetamidopropane-1,3-diol obtained by reacting 1-p-nitrophenyl-2-aminopropane-1,3-diol with methyl dichloracetate in methyl alcohol is a most surpising and unexpected phenomenon. The examples which are subsequently set forth in particular detail illustrate the outstanding advantages to be gained from the novel process of this invention.

In order to fully indicate the scope of the novel process of this invention, it should be pointed out that it is well known that both 1-p-nitrophenyl-2-dichloroacetamidopropane-1,3-diol and 1-p-nitrophenyl-2-aminopropane-1,3-diol exist in structural as well as optical isomeric forms and that it is contemplated that the novel process of this invention be applicable to all such isomeric forms and mixtures thereof. By structural isomers is meant the cis or trans forms of these compounds as determined by the planer relationship of the polar group on the two asymmetric carbon atoms. Hereinafter the cis compounds will be referred to as the "regular" (reg.) series or form and the trans isomer as the "pseudo" (ψ) series. The cis compounds are those compounds wherein the two most highly polar of the groups on the asymmetric carbon atoms lie on the same side of the plane of the two carbon atoms. The trans compounds are those wherein the two most highly polar groups lie on opposite sides of the plane of the two carbon atoms. Both the regular and pseudo forms exist as racemates of the optically active dextro [d] and levo [l] rotary isomers as well as in the form of the individual or separated dextro [d] and levo [l] optical isomers. This system of nomenclature and designation of the various isomeric forms of the compounds in question is identical with that utilized in U. S. Patent 2,483,885. Throughout this specification and the claims, individual isomers of 1-p-nitrophenyl-2-dichloroacetamidopropane-1,3-diol and 1-p-nitrophenyl-2-aminopropane-1,3-diol will be referred to in accordance with the abbreviations set forth above, but it is to be understood that where no notation appears with the name of the compound, the formula is to be interpreted in its generic sense, i. e., as representing the various isomeric forms of the compound individually or unresolved mixtures of the structural and optical isomers.

The following examples are illustrative of the present invention and are not to be construed as limitative thereof.

*Example I*

A 500 cc. round-bottom, 3-necked flask fitted with an agitator and a thermometer is charged with 75 ml. of methanol and 25.5 g. of methyl dichloroacetate. This solution is warmed to 35° C. and then 30.0 g. of [l]-ψ-1-p-nitrophenyl-2-aminopropane-1,3-diol are added over a period of 10 to 15 minutes. This mixture is stirred at 35 to 38° C. until a clear solution results, after which time the stirring is continued for an additional one hour period.

While maintaining a temperature of about 35°–38° C., 195–200 ml. of water are then added drop-wise to the clear solution over a period of approximately two to three hours with constant agitation to precipitate [l]-ψ-1-p-nitrophenyl-2-dichloroacetamidopropane-1,3-diol. During this period, several seed crystals of [l]-ψ-1-p-nitrophenyl-2-dichloroacetamidopropane-1,3-diol are also added. Thereafter, the mixture is cooled to about 10° C. The mixture is filtered and the filter cake washed with 50–60 ml. of water at a temperature of 10° C. and then dried in a vacuum oven. [l]-ψ-1-p-nitrophenyl-2-dichloroacetamidopropane-1,3-diol is obtained in a 92% yield based on [l]-ψ-1-p-nitrophenyl-2-aminopropane-1,3-diol, and has the following properties:

Melting point _____ 150°–151° C.
Specific rotation _____ +19° at 25° C.
Color _____ Pale yellow crystals The uniqueness of the novel process of this invention may be made clearly evident by considering the yields of 1-p-nitrophenyl-2-dichloroacetamidopropane-1,3-diol obtained when the process described in Example I is repeated utilizing in place of methyl alcohol as the reaction medium, other water soluble inert organic solvents. These results are set forth in the following table wherein the first column specifies the reaction medium used, the second column the mols of [l]-ψ-1-p-nitrophenyl-2-aminopropane-1,3-diol, the third column the mols of methyl dichloroacetate, and the fourth column, the yield of [l]-ψ-1-p-nitrophenyl-2-dichloroacetamidopropane-1,3-diol obtained:

| Reaction Medium | Mols of [l]-ψ-1-p-nitrophenyl-2-aminopropane-1,3-diol | Mols of methyl dichloroacetate | Yield of [l]-ψ-1-p-nitrophenyl-2-dichloroacetamidopropane-1,3-diol |
|---|---|---|---|
| None | 1.000 | 3.710 | 69%. |
| Acetone | 1.000 | 1.117 | None. |
| Methanol | 1.000 | 1.000 | 87%. |
| Do | 1.000 | 1.113 | 92%. |
| Abs. Ethanol | 1.000 | 1.117 | 83%. |
| n-Propanol | 1.000 | 1.117 | Less than 50%. |
| tert-Butanol | 1.000 | 1.117 | Do. |
| 1,5-Pentanediol | 1.000 | 1.117 | Do. |
| Ethylene glycol | 1.000 | 1.117 | 83%. |
| Triethylene glycol | 1.000 | 1.117 | 74%. |

These data clearly indicate the outstanding and unexpected superiority of methyl alcohol as a reaction medium in the novel process of this invention as compared with other water-miscible solvents.

*Example II*

The procedure set forth in Example I is repeated utilizing 1-p-nitrophenyl-2-aminopropane-1,3-diol in place of the [l]-ψ-1-p-nitrophenyl-2-aminopropane-1,3-diol. An excellent yield of substantially pure 1-p-nitrophenyl-2-dichloroacetamidopropane-1,3-diol is obtained.

*Example III*

Repeating the procedure set forth in Example I but utilizing [dl]-ψ-1-p-nitrophenyl-2-aminopropane-1,3-diol in place of the [l]-ψ-1-p-nitrophenyl-2-aminopropane-1,3-diol, an excellent yield of substantially pure [dl]-ψ-1-p-nitrophenyl-2-dichloroacetamidopropane-1,3-diol is obtained.

*Example IV*

The procedure set forth in Example I is repeated utilizing [l]-reg.-1-p-nitrophenyl-2-aminopropane-1,3-diol in place of the [l]-ψ-1-p-nitrophenyl-2-aminopropane-1,3-diol. An excellent yield of substantially pure [l]-reg.-1-p-nitrophenyl-2-dichloroacetamidopropane-1,3-diol is obtained.

*Example V*

Utilizing [dl]-reg.-1-p-nitrophenyl-2-aminopropane-1,3-diol in place of the [l]-ψ-1-p-nitrophenyl-2-aminopropane-1,3-diol in Example I, an excellent yield of substantially pure [dl]-reg.-1-p-nitrophenyl-2-dichloroacetamidopropane-1,3-diol is obtained.

While specific reaction conditions have been set forth in the preceding examples, it will be obvious to those skilled in the art that substantial variation is possible without departing from the scope of this invention. Thus, for example, the temperature at which the reaction is carried out may be varied over a wide range, between the freezing point of the reaction mixture and the boiling point of the reaction mixture. Preferably, the reaction is carried out at a temperature in the range of from about 5° C. to the boiling point of the reaction mixture.

The quantities of the reactants utilized may also be substantially varied. It has been found to be particularly advantageous to utilize at least a one molecular proportion of methyl dichloroacetate for each one molecular proportion of 1-p-nitrophenyl-2-aminopropane-1,3-diol, and it is preferred that a slight excess of methyl dichloroacetate be used. Quantities of methyl dichloroacetate significantly in excess of a one molecular proportion for each one molecular proportion of 1-p-nitrophenyl-2-aminopropane-1,3-diol may be employed, if desired, but offer no significant advantage. Thus, as high as five or more molecular proportions of methyl dichloroacetate for each molecular proportion of 1-p-nitrophenyl-2-aminopropane-1,3-diol may be utilized, recovering the excess methyl dichloroacetate.

The quantity of methyl alcohol utilized as the reaction medium may also be substantially varied. It is preferred that a sufficient quantity of methyl alcohol be present to effect complete solution of the reactants at the reaction temperature. It should be pointed out, however, that complete solution of the reactants is not absolutely necessary. Highest yields of 1-p-nitrophenyl-2-dichloroacetamidopropane-1,3-diol are obtained when the methyl alcohol utilized as the reaction medium is substantially anhydrous, i. e., having a moisture content of less than about 0.5%.

In the preceding examples methyl dichloroacetate was not only utilized as a reactant in the novel process of this invention, but was also charged to the reaction mixture as such. It has been found, however, that under certain conditions other alkyl dichloroacetates may be charged to the reaction mixture in place of methyl dichloroacetate. When other alkyl dichloroacetates are utilized and the reaction is attempted at room temperature or below, the reaction proceeds at an impractically slow rate. If in such instances the reaction is attempted at a higher temperature, for example, at temperatures approaching the boiling point of the reaction mixture, an alcohol interchange appears to take place with the alkyl dichloroacetate reacting with the methyl alcohol utilized as the reaction medium to form methyl dichloroacetate and an alkyl alcohol, which methyl dichloroacetate then reacts immediately with the 1-p-nitrophenyl - 2 - aminopropane - 1,3 - diol. Therefore, when alkyl dichloroacetates other than methyl dichloroacetate are initially charged to the reaction mixture containing methyl alcohol as the reaction medium in accordance with the novel process of this invention, the reaction that takes place to form 1-p-nitrophenyl-2-dichloroacetamidopropane-1,3-diol is the reaction between methyl dichloroacetate and 1-p-nitrophenyl - 2 - aminopropane - 1,3 - diol. As illustrative examples, when a methanol solution of the butyl or hexyl ester of dichloroacetic acid is utilized in the reaction in place of a methanol solution of methyl dichloroacetate in any of the preceding examples, the butyl or hexyl dichloroacetate react with methyl alcohol to form methyl dichloroacetate and butyl or hexyl alcohol. The methyl dichloroacetate thus formed then reacts with 1-p-nitrophenyl-2-aminopropane-1,3-diol in a reaction medium comprising essentially methyl alcohol and a small amount of butyl or hexyl alcohol to form 1-p-nitrophenyl-2-dichloroacetamidopropane-1,3-diol. Since it is methyl dichloroacetate which is reacting with 1-p-nitrophenyl - 2 - aminopropane - 1,3 - diol to form the desired antibiotic, it is obvious that such a reaction comes within the scope of this invention.

While it is preferred that methyl alcohol be utilized as the solvent reaction medium in the novel process of this invention, it will be apparent to those skilled in the art, particularly in view of the foregoing remarks, that a solvent comprising essentially methyl alcohol may be utilized in carrying out the novel reaction of this invention. Thus, the solvent reaction medium comprising essentially methyl alcohol may contain limited amounts of other alkanols such as butyl alcohol, hexyl alcohol, ethylene glycol, propyl alcohol, ethyl alcohol, etc. Typical of such solvents comprising essentially methyl alcohol are those solvents containing methyl alcohol and from about 5% to about 15% by weight of other alkanols. Preferred solvent mediums are the water miscible solvents comprising essentially methyl alcohol.

After the reaction between methyl dichloroacetate and 1-p-nitrophenyl-2-aminopropane-1,3-diol is complete, 1-p-nitrophenyl-2-dichloroacetamidopropane-1,3-diol may be recovered from the reaction mixture by any method well known to those skilled in the art. A particularly convenient recovery procedure comprises the addition of water to the reaction mixture, thereby precipitating 1 - p - nitrophenyl - 2 - dichloroacetamidopropane-1,3-diol which may be filtered and recovered therefrom.

What is claimed is:

1. In a process for the preparation of 1-p-nitrophenyl - 2 - dichloroacetamidopropane - 1,3-diol, the step comprising reacting methyl dichloroacetate and 1-p-nitrophenyl-2-aminopropane-1,3-diol in a solvent comprising essentially methyl alcohol at a temperature between about 5° C. and the boiling point of the reaction mixture.

2. In a process for the preparation of 1-p-nitrophenyl - 2 - dichloroacetamidopropane - 1,3-diol, the step comprising reacting methyl dichloroacetate and 1-p-nitrophenyl-2-aminopropane-1,3-diol in a solvent comprising essentially substantially anhydrous methyl alcohol at a temperature between about 5° C. and the boiling point of the reaction mixture.

3. In a process for the preparation of 1-p-nitrophenyl - 2 - dichloroacetamidopropane - 1,3-diol, the step comprising reacting methyl dichloroacetate and 1-p-nitrophenyl-2-aminopropane-1,3-diol in substantially anhydrous methyl alcohol at a temperature between about 5° C. and the boiling point of the reaction mixture.

4. In a process for the preparation of [l]-$\psi$-1 - p - nitrophenyl - 2 - dichloroacetamidopropane-1,3-diol, the step comprising reacting methyl dichloroacetate and [l]-$\psi$-1-p-nitrophenyl - 2 - aminopropane - 1,3 - diol in substantially anhydrous methyl alcohol at a temperature between about 5° C. and the boiling point of the reaction mixture.

5. In a process for the preparation of [dl]-$\psi$-1 - p - nitrophenyl - 2 - dichloroacetamidopropane-1,3-diol, the step comprising reacting methyl dichloroacetate and [dl]-$\psi$-1-p-nitrophenyl - 2 - aminopropane - 1,3 - diol in substantially anhydrous methyl alcohol at a temperature between about 5° C. and the boiling point of the reaction mixture.

6. In a process for the preparation of [l]-reg.-1 - p - nitrophenyl - 2 - dichloroacetamidopropane-1,3-diol, the step comprising reacting methyl dichloroacetate and [l]-reg.-1-p-nitrophenyl-2-aminopropane-1,3-diol in substantially anhydrous methyl alcohol at a temperature between about 5° C. and the boiling point of the reaction mixture.

7. In a process for the preparation of [dl]-reg. - 1 - p - nitrophenyl - 2 - dichloroacetamidopropane-1,3-diol, the step comprising reacting methyl dichloroacetate and [dl]-reg.-1-p-nitrophenyl-2-aminopropane-1,3-diol in substantially anhydrous methyl alcohol at a temperature between about 5° C. and the boiling point of the reaction mixture.

HARRY R. GAMRATH.
WILLIAM S. KNOWLES.

References Cited in the file of this patent

UNITED STATES PATENTS

| Number | Name | Date |
| --- | --- | --- |
| 2,483,884 | Crooks et al. | Oct. 4, 1949 |
| 2,483,885 | Crooks et al. | Oct. 4, 1949 |